(12) United States Patent
Dalal et al.

(10) Patent No.: US 11,822,683 B2
(45) Date of Patent: Nov. 21, 2023

(54) SYSTEM FOR AUTOMATIC PERMISSION MANAGEMENT IN DIFFERENT COLLABORATION SYSTEMS

(71) Applicant: Seclore Technology Private Limited, Mumbai (IN)

(72) Inventors: Zubin Dalal, Mumbai (IN); Mehul Gala, Mumbai (IN)

(73) Assignee: SECLORE TECHNOLOGY PRIVATE LIMITED, Mumbai (IN)

( * ) Notice: Subject to any disclaimer, the term of this patent is extended or adjusted under 35 U.S.C. 154(b) by 550 days.

(21) Appl. No.: 16/264,247

(22) Filed: Jan. 31, 2019

(65) Prior Publication Data

US 2020/0175185 A1      Jun. 4, 2020

(30) Foreign Application Priority Data

Nov. 30, 2018   (IN) .............................. 201821045265

(51) Int. Cl.
| | | |
|---|---|---|
| *G06F 3/048* | (2013.01) | |
| *G06F 21/62* | (2013.01) | |
| *G06F 16/176* | (2019.01) | |

(52) U.S. Cl.
CPC ........ *G06F 21/6218* (2013.01); *G06F 16/176* (2019.01)

(58) Field of Classification Search
CPC .. G06F 21/6218; G06F 16/176; G06F 21/604; G06F 16/93; G06Q 10/103; G06Q 10/10; H04L 63/101
See application file for complete search history.

(56) References Cited

U.S. PATENT DOCUMENTS

| | | | |
|---|---|---|---|
| 2001/0047485 A1 | 11/2001 | Brown et al. | |
| 2002/0026592 A1 | 2/2002 | Gavrila et al. | |
| 2006/0089970 A1* | 4/2006 | Pearson | H04L 51/12 709/206 |
| 2008/0005024 A1* | 1/2008 | Kirkwood | G06Q 10/00 705/50 |
| 2008/0033955 A1* | 2/2008 | Fujii | G06F 21/6218 |
| 2008/0120382 A1* | 5/2008 | Heidloff | G06Q 10/107 709/206 |
| 2009/0292930 A1* | 11/2009 | Marano | G06F 21/6218 713/189 |
| 2009/0307604 A1* | 12/2009 | Giles | G06Q 10/10 715/751 |
| 2011/0137947 A1* | 6/2011 | Dawson | G06F 21/6209 707/785 |
| 2012/0017000 A1* | 1/2012 | Lim | H04L 63/1425 709/229 |
| 2012/0278405 A1* | 11/2012 | Costenaro | H04L 51/08 709/206 |
| 2013/0080545 A1* | 3/2013 | Datta | G06Q 10/107 709/206 |
| 2013/0187862 A1* | 7/2013 | Jan | G06F 3/0484 345/173 |
| 2015/0113079 A1* | 4/2015 | Etgar | H04L 51/22 709/206 |
| 2015/0135300 A1* | 5/2015 | Ford | G06Q 50/18 726/11 |
| 2015/0264111 A1* | 9/2015 | Aleksandrov | H04L 51/08 726/4 |
| 2016/0028734 A1* | 1/2016 | Faitelson | G06Q 10/00 726/28 |
| 2016/0315887 A1* | 10/2016 | Uraizee | H04L 67/306 |
| 2017/0353466 A1* | 12/2017 | Weaver | G06F 40/166 |
| 2018/0205772 A1* | 7/2018 | Panchbudhe | H04L 51/066 |
| 2019/0190863 A1* | 6/2019 | Baker | H04L 63/101 |

* cited by examiner

*Primary Examiner* — Steven B Theriault
(74) *Attorney, Agent, or Firm* — Kwan & Olynick LLP

(57) ABSTRACT

A system for automatic permission management in different collaboration systems is described. The rights management system enabled with the present invention provides a "detection component" or "connector" that will identify the user who is sharing the protected document and list of recipients who need to be given access to it. The content sharing systems include but are not limited to shared local or network folders or messaging tools like email or chatting applications, and collaboration tools like SHAREPOINT, BOX, DROPBOX, GOOGLE DRIVE, etc. The permissions for users are added to the document/mail as and when it flows through different collaboration or distribution systems, thus enabling the business users to access the document without any disruption in their normal business workflow.

20 Claims, 1 Drawing Sheet

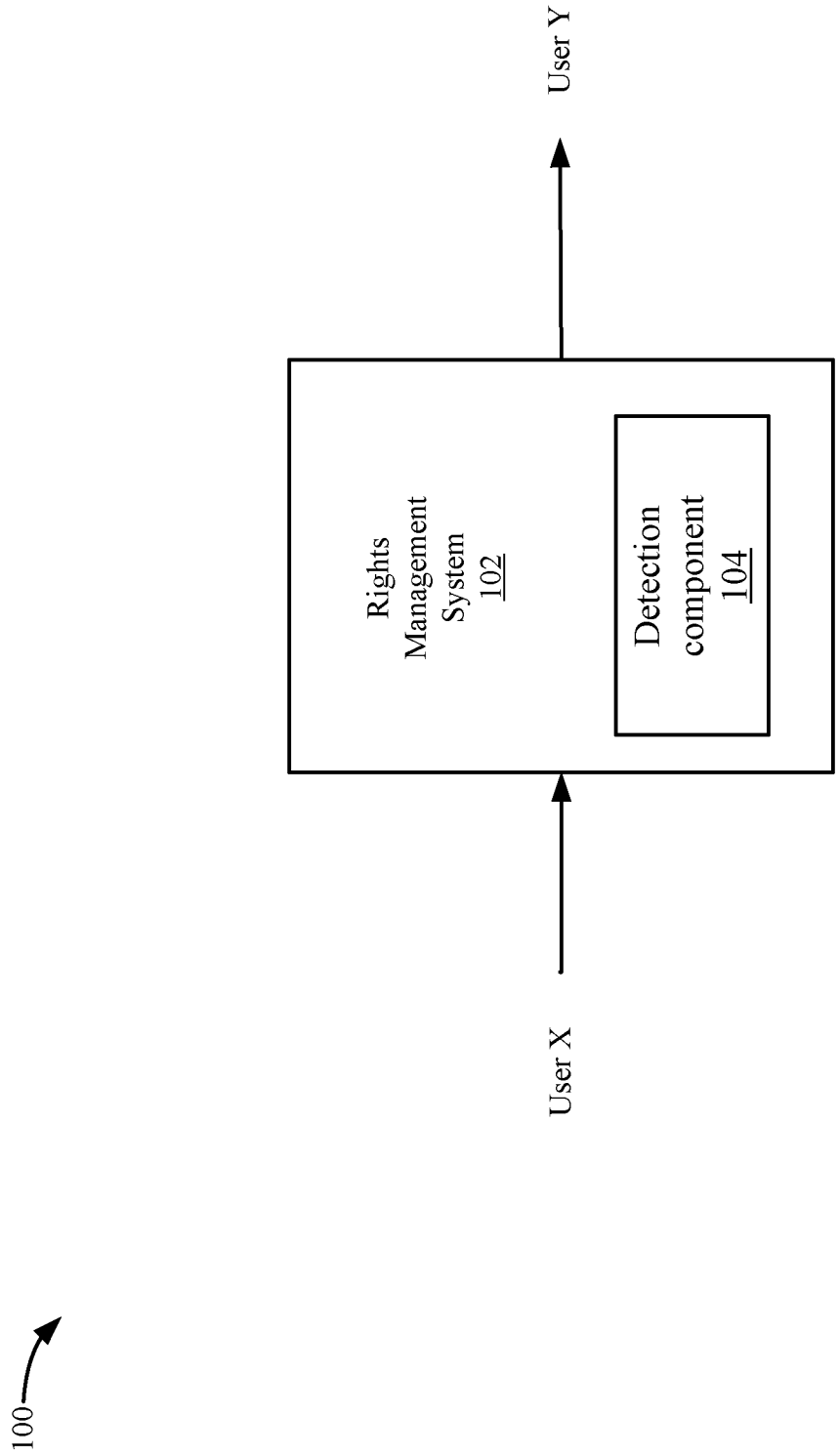

SYSTEM FOR AUTOMATIC PERMISSION MANAGEMENT IN DIFFERENT COLLABORATION SYSTEMS

CROSS-REFERENCE TO RELATED APPLICATION

The instant application claims priority to Indian Patent Application Serial No. 201821045265, filed Nov. 30, 2018, pending, the entire specification of which is expressly incorporated herein by reference.

FIELD OF THE INVENTION

The present invention relates to the capability of a rights management system 102 to automate and facilitate the management of permissions of a document or file that is protected by that rights management system 102, as and when the users share these documents and files using various systems for content sharing. The content sharing systems include but are not limited to shared local or network folders or messaging tools like email or chatting applications, and collaboration tools like SHAREPOINT, BOX, DROPBOX, GOOGLE DRIVE, etc.

DEFINITIONS

As used in the present disclosure, the following terms are generally intended to have the meaning as set forth below, except to the extent that the context in which they are used, indicate otherwise.

The expression "protected document," as used hereinafter in this specification refers to, but is not limited to, any digital file or document that is enveloped with a rights management technology that ensures the content in the document is always encrypted and access to the content in decrypted format is only granted to specific users who have been given that permission by the owner of the document.

The expression "owner of the document," as used hereinafter in this specification refers to, but is not limited to, the person who applies the rights management protection to the document.

The expression "permissions," as used hereinafter in this specification refers to, but is not limited to, instruction given by the owner of a protected document to the rights management system 102 to indicate that a specific user has access to that protected document and what actions that user can perform on that document i.e., read, edit, print, copy data, screen capture, etc.

The expression "change permission," as used hereinafter in this specification refers to, but is not limited to the specific permission that allows the user holding this permission to give access to other users.

The expression "rights management system 102," as used hereinafter in this specification refers to, but is not limited to, the system that allows its users to control the access of electronic files and documents and limit the access to specific users or user groups only. Further it also limits the actions that a user or user group can take on a document i.e., read, edit, print, copy data, screen capture, etc.

BACKGROUND OF THE INVENTION

In most of the installed operating systems, permissions determine whether a user may access data and programs of the System and its applications, as well as the way the access can be performed (e.g., read, write, execute, and append).

In case of information rights management system 102 or any other system where the permissions are attached to the document or email and are enforced wherever the document/email travels to, one of the biggest challenges is to pre-determine which all users need permissions on the document. In a real-life business scenario, this task can be very hard to define. In many cases, the solutions to this problem may either be by giving permissions to all users or only the author (originator) of the document. In the latter case, users would need to explicitly ask for permissions on these documents/emails, breaking the flow of their work.

The existing conventional mechanisms do not have any elegant solution to this problem. The documents which have protection are accessed by a restricted set of users. These users are expected to manually change permissions on the document before sharing them with other users so that the new recipients are added to the policy. If this step is not performed, then the new recipients will receive the documents but will not be able to work with them since they do not have permissions on the documents. In that case, the new recipient may request for permissions on the document. However, this breaks the flow for the user as he/she must wait to get permissions on the document/email.

Alternatively, system can allow everyone (or most of the users) to access the document so that the chances of any user not having permissions on the document are reduced. However, this reduces the security posture of the document.

Management of permissions scales to large configurations of systems when hundreds of applications, tens of thousands of users and hundreds of thousands of objects are involved. Permission management at such low granularity often leads to increased administrative costs, administrator confusion, and to unnoticed errors, due to the sheer magnitude of the tasks being faced by system administrators.

US patent application publication no. 20020026592 discloses a method for automatic permission management in centralized and distributed operating systems using role-based access control that supports selective and multiple instantiations of roles, multiple inheritances of permission and membership, and provides scalable and efficient distribution, review, and revocation of permissions and access authorization.

US patent application publication no. 20010047485 discloses a security system for a computer system which provides one or more security domains. Access to assets registered to the security system is controlled by rights and privileges. Rights are derived from roles, and each user is assigned one or more roles and privileges are attached to assets, and an appropriate combination of rights and privileges is required before a user is granted the specified type of access to the asset.

The permission management systems discussed above has less efficient access authorization and the systems are less secure than anticipated.

OBJECTS OF THE INVENTION

The object of the present invention is to provide a mechanism to automatically discover and modify the permissions on a document or email that is protected with a rights management system 102, as it flows through different communication or collaboration systems.

Another object of the present invention is to provide a mechanism that allows simplifying the management of permissions and hence allowing fewer opportunities for administrative confusion, errors, and security breaches during permission management.

SUMMARY OF THE INVENTION

Before the present invention is described, it is to be understood that the present invention is not limited to specific methodologies and materials described, as these may vary as per the person skilled in the art. It is also to be understood that the terminology used in the description is for the purpose of describing the particular embodiments only and is not intended to limit the scope of the present invention.

The present invention describes a system to automatically discover and update the permissions on a protected document or email as it flows through different systems. Different collaboration systems have different mechanisms to plug a separate component in them, which can trace user activities and document movements. This detection component 104 identifies the newly added recipients to whom a protected document or mail is about to be shared, and thereby, grants permissions to them. The detection component 104 appropriately triggers the smart sharing of permission for the recipients. The invention helps in simplifying the management of permissions and hence allowing fewer opportunities for administrative confusion, errors, and security breaches during permission management.

BRIEF DESCRIPTION OF THE DRAWINGS

FIG. 1 depicts a system to automatically discover and update the permissions on a document/email according to some embodiments.

DETAILED DESCRIPTION OF THE INVENTION

FIG. 1 depicts a system 100 to automatically discover and update the permissions on a document/email as it flows through different communication and collaboration systems.

When documents or emails are protected with a rights management system 102 102, the user permissions are attached to the document or email itself. In such instances, the permissions are not defined for the container or the folder or the system hosting or storing the document. When a document or email is protected with a rights management system 102, it will have an initial set of user permissions, but when the document/email is forwarded or shared with other users by the authorized user, the new recipients may not have the permissions on the document and hence they are not able to access the document/email.

The preferred embodiment of the invention provides a mechanism by which the permissions on the document/email change automatically as the document/mail flows through different communication or collaboration systems. For example, if a document is stored in a folder on which user X has permissions to read the document and user X sends that document via email to user Y. The system described in the present invention, comprehends that since user X has forwarded the document to user Y, now user Y should also be given permissions on the document. This action is taken only if user X has been given access to "change permissions" on the document.

In situations where, the user who shares the document/mail does not have "change permission" access to grant permissions to other users, the rights management system 102 that is enhanced with the present invention can still facilitate the permission granting workflow for the recipients by notifying the owner of the document to grant them permissions.

The same automatic granting of permissions or notification to the owner for granting permissions can also be done when uploading a document to content collaboration platforms like MICROSOFT SHAREPOINT, BOX, DROPBOX OR GOOGLE DRIVE.

The document/email typically has some permission to start with. This gives access to an initial set of users. It also identifies which users have access to "change permissions" on this document. The system of the present invention involves a mechanism by which it can detect when one of these users (having change permission) share the document/email with another user, then the system automatically includes the new recipient(s) in the policy and allows them access to the document/email.

Almost all collaboration systems have integration capabilities that enable other systems to be informed when a user shares or publishes a document to other users within the collaboration system. The rights management system 102 enabled with the present invention provides a "detection component 104" or "connector" that will identify the user who is sharing the protected document and list of recipients who need to be given access to it.

In the preferred embodiment in the present invention, when the document is shared via email, a component placed within the email infrastructure helps in this detection. In case of email clients such as GMAIL or OUTLOOK, a plug-in or add-in is plugged into mail infrastructure to trace the movement of mails. The plug in has complete knowledge of the mail data and has the information regarding the sender and the recipients. The component detects whether the sender has "change permission" rights. It also detects whether any of the recipients to whom this mail is forwarded or replied to has any access on the email or the attachment. Based on this knowledge the component grants the permissions or facilitates the granting of the same. If the user uploading the document doesn't have "change permission" rights, it will trigger a request for permission to the original owner of the protected document. For example, once the detection component 104 detects a document forwarded by user X to user Y by email, it decides whether user Y should be automatically added to the policy of the document. Hence, the component appropriately triggers the smart sharing of permissions in the document/mail to the recipients.

Similarly, on other systems one can plug similar sort of components to do the same task. For example, but not limited to in SHAREPOINT, BOX, DROPBOX, GOOGLE DRIVE, etc., a connector can be provided that monitors all documents uploaded to a document folder or library and identifies which users have access to that folder or library. If the user uploading the document has "change permission" rights, the other users of that folder or library will be automatically given permissions in the rights management system 102.

A detection component 104 is integrated with cloud storage service like BOX or ONEDRIVE. This detection component 104 registers itself to detect the events from the cloud storage. When user X uploads file in one of the BOX folder, the detection component 104 gets an event. User Y already has permissions on the BOX folder. The detection component 104 then gives permissions to user Y on the document.

A mail transfer agent can be introduced in the email server infrastructure that monitors all emails flowing within and outside the email system and identifies any protected emails/attachments that are flowing through the email server. For each protected email/attachment it can give the permissions if the email sender has "change permissions" rights or trigger a request to the owner of the protected document to give permissions As described in the embodiments of the invention, permissions for users are attached to the document/mail as and when it flows through different collaboration or distribution systems, thus enabling the business users to access the document without any disruption in their normal business workflow.

The technical advancements of the system and method envisaged by the present disclosure include that:

The system helps in intelligently discovering and facilitating the granting of access permissions on a protected document without the associated manual overheads for the end user in any typical rights management system 102 that exists without this invention.

The system reduces the user's manual overheads of changing rights management permissions every time a document needs to be shared with others.

The system does not compromise the security of the document, as the original owner of the document controls which users have the "change permission" rights.

The system also reduces the information technology overheads of training business users in doing specific tasks like adding and changing permissions in the rights management system 102.

The disclosure has been described with reference to the accompanying embodiments which do not limit the scope and ambit of the disclosure. The description provided is purely by way of example and illustration.

The embodiments herein above and the various features and advantageous details thereof are explained with reference to the non-limiting embodiments in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification, the word "comprise," or variations such as "comprises" or "comprising," will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of files, acts, materials, devices, articles or the like that has been included in this specification is solely for providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A method of rights management to automate and facilitate the management of permissions of a protected document in a plurality of collaboration systems, the plurality of collaboration systems including a first collaboration system associated with a sender that is different from a set of second collaboration system associated with a list of recipients, the method comprising:
   detecting, by a plug-in or add-in of a mail system infrastructure configured to monitor movement of communications from the first collaboration system vis the mail system infrastructure and has access to sender and recipients of the communications, a movement of the protected document as an attachment to a communication that is sent from the first collaboration system to the set of collaboration systems for the list of recipients, wherein the sender of the protected document has permission to access the protected document and the recipients in the list of recipients do not yet have access to the protected document before the sender shares the protected document with the list of recipients;
   in response to detecting the movement of the protected document as the attachment to the communication, triggering a process to analyze the permissions of the protected document, wherein the process performs:
      identifying, by the plug-in or add-in, whether the sender of the protected document has access to change permissions on the protected document, wherein the protected document is associated with permissions for accessing the protected document;
      sharing the protected document to the list of recipients;
      if the sender has access to change permissions on the protected document, automatically changing, by the plug-in or add-in, the permissions as the protected document moves from the first collaboration system to the set of collaboration systems based on the sender having the access to change permissions on the protected document; and
      if the sender does not have access to change permissions on the protected document, automatically triggering, by the plug-in or add-in, a request for the changing of permissions to contact an owner of the protected document to grant a recipient in the list of recipients permission for accessing the protected document without requiring a request for permission from the sender or owner, wherein the sender cannot grant the list of recipients permission for accessing the protected document, and wherein the owner is different from the sender and can grant the list of recipients permission for accessing the protected document.

2. The method as claimed in claim 1, wherein the first collaboration system and the set of second collaboration systems include an email system, content collaboration tool or file sharing application.

3. The method as claimed in claim 1, further comprising listening to events to trace movement of emails to detect the movement of the protected document as the attachment to the communication.

4. The method as claimed in claim 1, further comprising detecting rights available to the sender and the list of recipients to change permissions.

5. The method as claimed in claim 1, further comprising monitoring all emails flowing within and outside an email system and identifying protected documents that are flowing through an email server, wherein the movement of the protected document as the attachment to the communication is detected by the monitoring.

6. The method as claimed in claim 1, wherein detecting the movement is performed by the plug-in or add-in in the first collaboration system that is listening to document upload or download events and taking action accordingly.

7. The method as claimed in claim 6, wherein the plug-in or add-in monitors all documents uploaded to a document folder and identifies users that have access to that folder.

8. The method as claimed in claim 6, wherein the plug-in or add-in automatically grants permissions to the users uploading the document having the rights to change permissions.

9. The method as claimed in claim 6, wherein the plug-in or add-in triggers a request for permission to the owner of the protected document if a user uploading the document does not have the rights to change permissions.

10. The method as claimed in claim 1, further comprising:
if the sender does not have access to change permissions on the protected document, sending a notification to a user with permission to change permissions to change the permissions of the document.

11. The method as claimed in claim 1, wherein the permissions are associated with the communication.

12. The method as claimed in claim 1, wherein the permissions are associated with the protected document.

13. The method as claimed in claim 1, wherein the plug-in or add-in is a plug-in or add-in of a mail system that is processing the communication.

14. A non-transitory computer-readable storage medium containing instructions for rights management to automate and facilitate the management of permissions of a protected document in a plurality of collaboration systems, the plurality of collaboration systems including a first collaboration system associated with a sender that is different from a set of second collaboration system associated with a list of recipients, wherein the instructions, when executed, control a computer system to be operable for:
detecting, by a plug-in or add-in of a mail system infrastructure configured to monitor movement of communications from the first collaboration system vis the mail system infrastructure and has access to sender and recipients of the communications, a movement of the protected document as an attachment to a communication that is sent from the first collaboration system to the set of collaboration systems for the list of recipients, wherein the sender of the protected document has permission to access the protected document and the recipients in the list of recipients do not yet have access to the protected document before the sender shares the protected document with the list of recipients;
in response to detecting the movement of the protected document as the attachment to the communication, triggering a process to analyze the permissions of the protected document, wherein the process performs:
identifying, by the plug-in or add-in, whether the sender of the protected document has access to change permissions on the protected document, wherein the protected document is associated with permissions for accessing the protected document;
sharing the protected document to the list of recipients;
if the sender has access to change permissions on the protected document, automatically changing, by the plug-in or add-in, the permissions as the protected document moves from the first collaboration system to the set of collaboration systems based on the sender having the access to change permissions on the protected document; and
if the sender does not have access to change permissions on the protected document, automatically triggering, by the plug-in or add-in, a request for the changing of permissions to contact an owner of the protected document to grant a recipient in the list of recipients permission for accessing the protected document without requiring a request for permission from the sender or owner, wherein the sender cannot grant the list of recipients permission for accessing the protected document, and wherein the owner is different from the sender and can grant the list of recipients permission for accessing the protected document.

15. The non-transitory computer-readable storage medium as claimed in claim 14, wherein the first collaboration system and the set of second collaboration systems include an email system, content collaboration tool or file sharing application.

16. The non-transitory computer-readable storage medium as claimed in claim 14, further operable for listening to events to trace movement of emails to detect the movement of the protected document as the attachment to the communication.

17. The non-transitory computer-readable storage medium as claimed in claim 14, further operable for detecting rights available to the sender and the list of recipients to change permissions.

18. The non-transitory computer-readable storage medium as claimed in claim 14, further operable for monitoring all emails flowing within and outside an email system and identifying protected documents that are flowing through an email server, wherein the movement of the protected document as the attachment to the communication is detected by the monitoring.

19. The non-transitory computer-readable storage medium as claimed in claim 14, further operable for:
if the sender does not have access to change permissions on the protected document, sending a notification to a user with permission to change permissions to change the permissions of the document.

20. An apparatus comprising:
one or more computer processors; and
a non-transitory computer-readable storage medium comprising instructions for rights management to automate and facilitate the management of permissions of a protected document in a plurality of collaboration systems, the plurality of collaboration systems including a first collaboration system associated with a sender that is different from a set of second collaboration system associated with a list of recipients, wherein the instructions, when executed, control the one or more computer processors to be operable for:
detecting, by a plug-in or add-in of a mail system infrastructure configured to monitor movement of communications from the first collaboration system vis the mail system infrastructure and has access to sender and recipients of the communications, a movement of the protected document as an attachment to a communication that is sent from the first collaboration system to the set of collaboration systems for the list of recipients, wherein the sender of the protected document has permission to access the protected document and the recipients in the list of recipients do not yet have access to the protected document before the sender shares the protected document with the list of recipients;
in response to detecting the movement of the protected document as the attachment to the communication, triggering a process to analyze the permissions of the protected document, wherein the process performs:
identifying, by the plug-in or add-in, whether the sender of the protected document has access to change permissions on the protected document, wherein the protected document is associated with permissions for accessing the protected document;
sharing the protected document to the list of recipients;
if the sender has access to change permissions on the protected document, automatically changing, by the plug-in or add-in, the permissions as the protected document moves from the first collaboration system to the set of collaboration systems based on the sender having the access to change permissions on the protected document; and
if the sender does not have access to change permissions on the protected document, automatically triggering, by the plug-in or add-in, a request for the changing of permissions to contact an owner of the protected document to grant a recipient in the list of recipients permission for accessing the protected document without requiring a request for permission from the sender or owner, wherein the sender cannot grant the list of recipients permission for accessing the protected document, and wherein the owner is different from the sender and can grant the list of recipients permission for accessing the protected document.

* * * * *